(12) United States Patent
Dalal et al.

(10) Patent No.: US 10,037,276 B1
(45) Date of Patent: Jul. 31, 2018

(54) SYSTEMS AND METHODS FOR ACCELERATING ACCESS TO DATA BY PRE-WARMING THE CACHE FOR VIRTUAL MACHINES

(71) Applicant: Veritas Technologies LLC, Mountain View, CA (US)

(72) Inventors: Chirag Dalal, Pune (IN); Vaijayanti Bharadwaj, Pune (IN); Pradip Kulkarni, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/931,886

(22) Filed: Nov. 4, 2015

(51) Int. Cl.
*G06F 12/08* (2016.01)
*G06F 3/06* (2006.01)
(Continued)

(52) U.S. Cl.
CPC .......... *G06F 12/0806* (2013.01); *G06F 3/061* (2013.01); *G06F 3/0638* (2013.01); *G06F 3/0683* (2013.01); *G06F 9/45558* (2013.01); *G06F 2009/45583* (2013.01); *G06F 2212/1016* (2013.01); *G06F 2212/60* (2013.01)

(58) Field of Classification Search
CPC .... G06F 12/0806; G06F 3/061; G06F 3/0638; G06F 3/0683; G06F 9/45558; G06F 2009/45583; G06F 2212/1016; G06F 2212/60; G06F 3/0611; G06F 3/064; G06F 2212/1024; G06F 2212/602; G06F 2212/6022; G06F 2212/6026; G06F 12/0862; G06F 12/0215
See application file for complete search history.

(56) References Cited

U.S. PATENT DOCUMENTS 5,305,389 A * 4/1994 Palmer ................ G06F 12/0862
382/100
7,356,679 B1 * 4/2008 Le ..................... G06F 17/30067
707/E17.01

(Continued)

OTHER PUBLICATIONS

Niranjan Pendharkar; Systems and Methods for Enabling Write-Back Caching and Replication at Different Abstraction Layers; U.S. Appl. No. 13/720,871, filed Dec. 19, 2012.
(Continued)

*Primary Examiner* — Mano Padmanabhan
*Assistant Examiner* — Andrew J Cheong
(74) *Attorney, Agent, or Firm* — FisherBroyles LLP

(57) ABSTRACT

The disclosed computer-implemented method for accelerating access to data may include (1) monitoring, at a data-caching system, read requests of a first data-accessing system for a dataset managed by a data-management system, (2) identifying a pattern of the read requests of the first data-accessing system, (3) monitoring, at the data-caching system, read requests of a second data-accessing system for the dataset managed by the data-management system, (4) determining that a pattern of the read requests of the second data-accessing system resembles the pattern of the read requests of the first data-accessing system, and (5) using a portion of the dataset accessed by the read requests of the first data-accessing system to pre-warm a cache of the second data-accessing system. Various other methods, systems, and computer-readable media are also disclosed.

20 Claims, 8 Drawing Sheets

(51) Int. Cl.
*G06F 9/455* (2018.01)
*G06F 12/0806* (2016.01)

(56) References Cited

U.S. PATENT DOCUMENTS

| | | | | |
|---|---|---|---|---|
| 8,539,137 B1* | 9/2013 | Protassov | ............ | G06F 3/0619 711/203 |
| 8,776,028 B1* | 7/2014 | Enakiev | ............ | G06F 11/3664 714/38.11 |
| 8,868,839 B1* | 10/2014 | Banerjee | ............ | G06F 12/0804 711/118 |
| 9,052,935 B1* | 6/2015 | Rajaa | ............ | G06F 9/45558 |
| 9,317,320 B2* | 4/2016 | Lee | ............ | G06F 9/45558 |
| 9,378,141 B1* | 6/2016 | Thukral | ............ | H04L 67/2842 |
| 2002/0083183 A1* | 6/2002 | Pujare | ............ | G06F 8/65 709/231 |
| 2002/0087883 A1* | 7/2002 | Wohlgemuth | ............ | G06F 8/65 726/29 |
| 2002/0091763 A1* | 7/2002 | Shah | ............ | G06F 8/65 709/203 |
| 2002/0157089 A1* | 10/2002 | Patel | ............ | G06F 8/65 717/178 |
| 2002/0161908 A1* | 10/2002 | Benitez | ............ | G06F 8/65 709/231 |
| 2003/0004882 A1* | 1/2003 | Holler | ............ | G06F 8/65 705/51 |
| 2003/0009538 A1* | 1/2003 | Shah | ............ | H04L 63/0281 709/219 |
| 2008/0155169 A1* | 6/2008 | Hiltgen | ............ | G06F 9/5077 711/6 |
| 2008/0155208 A1* | 6/2008 | Hiltgen | ............ | G06F 9/45533 711/154 |
| 2008/0155223 A1* | 6/2008 | Hiltgen | ............ | G06F 9/45558 711/173 |
| 2009/0070752 A1* | 3/2009 | Alpern | ............ | G06F 8/63 717/148 |
| 2009/0106256 A1* | 4/2009 | Safari | ............ | G06F 11/1433 |
| 2009/0228647 A1* | 9/2009 | Klems | ............ | H04L 67/104 711/113 |
| 2011/0083037 A1* | 4/2011 | Bocharov | ............ | H04N 21/23116 714/4.11 |
| 2011/0087874 A1* | 4/2011 | Timashev | ............ | G06F 9/44589 713/100 |
| 2011/0148895 A1* | 6/2011 | Burckart | ............ | G06F 9/45558 345/557 |
| 2013/0117252 A1* | 5/2013 | Samaddar | ............ | G06F 17/30864 707/709 |
| 2013/0238802 A1* | 9/2013 | Sarikaya | ............ | H04L 29/08153 709/226 |
| 2014/0033179 A1* | 1/2014 | Gustus | ............ | G06F 11/3664 717/127 |
| 2014/0164529 A1* | 6/2014 | Kleppmann | ............ | H04L 29/08072 709/206 |
| 2014/0189071 A1* | 7/2014 | Leighton | ............ | H04L 67/2847 709/219 |
| 2015/0100958 A1* | 4/2015 | Banavalikar | ............ | G06F 9/45558 718/1 |
| 2015/0235015 A1* | 8/2015 | Holler | ............ | G06F 21/105 726/27 |
| 2015/0356031 A1* | 12/2015 | Gintis | ............ | G06F 13/102 710/61 |
| 2016/0026490 A1* | 1/2016 | Johnsson | ............ | H04L 43/0864 718/1 |
| 2016/0179395 A1* | 6/2016 | Fisher | ............ | G06F 3/0608 711/103 |
| 2017/0003999 A1* | 1/2017 | Dalal | ............ | G06F 9/45558 |

OTHER PUBLICATIONS

Niranjan Pendharkar, et al.; Systems and Methods for Identifying Access Rate Boundaries of Workloads; U.S. Appl. No. 14/269,192, filed May 4, 2014.

Joseph Chen, et al.; Systems and Methods for Detecting Unknown Vulnerabilities in Computing Processes; U.S. Appl. No. 14/822,930, filed Aug. 11, 2015.

Vaijayanti Bharadwaj, et al.; Systems and Methods for Coordinating Data Caching on Virtual Storage Appliances; U.S. Appl. No. 14/935,836, filed Nov. 9, 2015.

"Actifio Sky", http://www.actifio.com/technology/solutions-architecture/actifio-sky/, as accessed Sep. 29, 2015, (Feb. 23, 2015).

"Rubrik", http://www.rubrik.com/product/, as accessed Sep. 29, 2015, (On or before Sep. 29, 2015).

"Oracle", http://www.oracle.com/index.html, as accessed Sep. 29, 2015, (Dec. 19, 1996).

"Velocity", https://velocitycloud.com/, as accessed Sep. 29, 2015, (Feb. 2, 2011).

Kevin Jiang, et al; Systems and Methods for Locating Devices on Wireless Networks According to Zones; U.S. Appl. No. 14/958,316, filed Dec. 3, 2015.

Sudhakar Paulzagade, et al; Systems and Methods for Restoring Data from Opaque Data Backup Streams; U.S. Appl. No. 14/965,249, filed Dec. 10, 2015.

* cited by examiner

SYSTEMS AND METHODS FOR ACCELERATING ACCESS TO DATA BY PRE-WARMING THE CACHE FOR VIRTUAL MACHINES

BACKGROUND

Many computing systems cache data in a caching mechanism to facilitate fast, efficient access to the data. Some computing systems may need to access data that is stored at a remote network-accessible storage system. For example, many organizations use virtual machines to perform application testing, often in the cloud. Because of various factors such as network latency, a remote storage system may be unable to facilitate direct access to data as quickly or efficiently as a local cache. In these situations, computing systems may implement a caching system that copies data from a remote storage system to a local cache in order to increase the speed at which the data may be subsequently accessed.

However in the above mentioned scenario, typical caching mechanisms generally do not increase the speed at which data is first accessed since the data must be copied from a remote storage system to a local cache. For at least this reason, some computing systems (e.g., application development and testing environments) that access large amounts of data during initialization phases of the computing systems and/or that infrequently access the same data during post-initialization phases of the computing systems may not see a significant difference between the speed at which data is accessed from a local cache and the speed at which data is accessed from a remote storage system. The instant disclosure, therefore, identifies and addresses a need for improved systems and methods for accelerating access to data.

SUMMARY

As will be described in greater detail below, the instant disclosure describes various systems and methods for accelerating access to data. In one example, a computer-implemented method for accelerating access to data may include (1) monitoring, at a data-caching system, read requests of a first data-accessing system for a dataset managed by a data-management system, (2) identifying a pattern of the read requests of the first data-accessing system, (3) monitoring, at the data-caching system, read requests of a second data-accessing system for the dataset managed by the data-management system, (4) determining that a pattern of the read requests of the second data-accessing system resembles the pattern of the read requests of the first data-accessing system, and (5) using, in response to determining that the pattern of the read requests of the second data-accessing system resembles the pattern of the read requests of the first data-accessing system, a portion of the dataset accessed by the read requests of the first data-accessing system to pre-warm the cache of the second data-accessing system. In some embodiments, the data-caching system may (1) serve the dataset to the first data-accessing system, (2) maintain a cache for the first data-accessing system, (3) serve the dataset to the second data-accessing system, and/or (4) maintain a cache for the second data-accessing system.

In some embodiments, the first data-accessing system may include a first virtual machine running on a hypervisor, the second data-accessing system may include a second virtual machine running on the hypervisor, and the data-caching system may execute within a third virtual machine running on the hypervisor. In other embodiments, the first data-accessing system may include a first virtual machine running on a first hypervisor, the second data-accessing system may include a first virtual machine running on a second hypervisor, and the data-caching system may include (1) a first data-caching subsystem that maintains the cache for the first data-accessing system and executes within a second virtual machine running on the first hypervisor and (2) a second data-caching subsystem that maintains the cache for the second data-accessing system and executes within a second virtual machine running on the second hypervisor. In at least one embodiment, the first data-accessing system may include a first virtual machine running on a hypervisor, the second data-accessing system may include a second virtual machine running on the hypervisor, and the data-caching system may include a data-caching module of the hypervisor.

In some embodiments, the computer-implemented method may further include storing a representation of the pattern of the read requests of the first data-accessing system in association with the dataset. In some embodiments, the step of determining that the pattern of the read requests of the second data-accessing system resembles the pattern of the read requests of the first data-accessing system may include determining that the pattern of the read requests of the second data-accessing system matches the pattern of the read requests of the first data-accessing system. In other embodiments, the step of determining that the pattern of the read requests of the second data-accessing system resembles the pattern of the read requests of the first data-accessing system may include determining that a similarity of the pattern of the read requests of the second data-accessing system to the pattern of the read requests of the first data-accessing system is above a predetermined threshold.

In some embodiments, the dataset may include a copy of a production dataset of a production environment, the first data-accessing system may include a first application-testing system for testing a first modification of the production environment, and the second data-accessing system may include a second application-testing system for testing a second modification of the production environment. In certain embodiments, the first data-accessing system accesses a first virtualized copy of the dataset, and the second data-accessing system accesses a second virtualized copy of the dataset. In at least one embodiment, the cache for the first data-accessing system and the cache for the second data-accessing system may be part of a single deduplication-aware cache.

In some embodiments, the pattern of the read requests of the first data-accessing system may include an initialization pattern of the read requests of the first data-accessing system that occurs during an initialization phase of the first data-accessing system and/or a post-initialization pattern of the read requests of the first data-accessing system that occurs during a post-initialization phase of the first data-accessing system.

In one embodiment, a system for implementing the above-described method may include (1) a monitoring module, stored in memory, that monitors, at a data-caching system, (a) read requests of a first data-accessing system for a dataset managed by a data-management system and (b) read requests of a second data-accessing system for the dataset managed by the data-management system, (2) an identifying module, stored in memory, that identifies a pattern of the read requests of the first data-accessing system, (3) a determining module, stored in memory, that determines that a pattern of the read requests of the second data-accessing system resembles the pattern of the read requests of the first data-accessing system, (4) a pre-warming module, stored in memory, that uses, in response to the determination that the pattern of the read requests of the second data-accessing system resembles the pattern of the read requests of the first data-accessing system, a portion of the dataset accessed by the read requests of the first data-accessing system to pre-warm the cache of the second data-accessing system, and (5) at least one processor that executes the monitoring module, the identifying module, the determining module, and the pre-warming module. In some embodiments, the data-caching system may (1) serve the dataset to the first data-accessing system, (2) maintain a cache for the first data-accessing system, (3) serve the dataset to the second data-accessing system, and (4) maintain a cache for the second data-accessing system.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, at a data-caching system, read requests of a first data-accessing system for a dataset managed by a data-management system, (2) identify a pattern of the read requests of the first data-accessing system, (3) monitor, at the data-caching system, read requests of a second data-accessing system for the dataset managed by the data-management system, (4) determine that a pattern of the read requests of the second data-accessing system resembles the pattern of the read requests of the first data-accessing system, and (5) use, in response to determining that the pattern of the read requests of the second data-accessing system resembles the pattern of the read requests of the first data-accessing system, a portion of the dataset accessed by the read requests of the first data-accessing system to pre-warm the cache of the second data-accessing system. In some embodiments, the data-caching system may (1) serve the dataset to the first data-accessing system, (2) maintain a cache for the first data-accessing system, (3) serve the dataset to the second data-accessing system, and (4) maintain a cache for the second data-accessing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
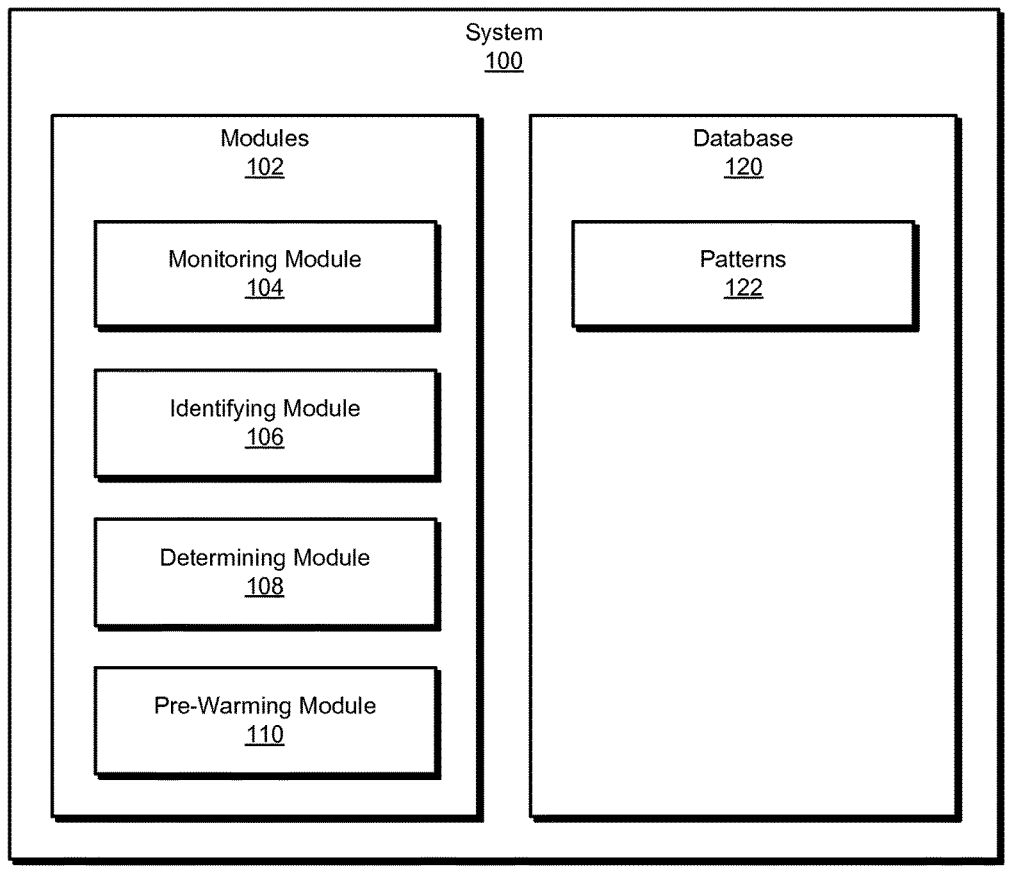
FIG. 1 is a block diagram of an exemplary system for accelerating access to data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for accelerating access to data. As will be explained in greater detail below, by (1) recording a pattern to which a first system requests to read a dataset, (2) later detecting that a second system requests to read the same dataset according to the same or a similar pattern, and (3) pre-warming a cache maintained for the second system according to the pattern of the first system, the systems and methods described herein may enable a data-caching system to increase the speed at which the second system accesses the dataset since data from the dataset may be prefetched to the cache maintained for the second system before the second system attempts to access the data. In some examples, by pre-warming a cache maintained for an application development and/or testing system with data from an associated application development and/or testing system's previously recorded pattern, these systems and methods may help speed up application development and testing workloads. Furthermore, in some examples, by speeding up application development and testing workloads, these systems and methods may enable application development and testing workloads to be processed in the cloud, especially when the datasets that are required for application testing remain on premise. Embodiments of the instant disclosure may also provide various other advantages and features, as discussed in greater detail below.

The following will provide, with reference to FIGS. 1-5, detailed descriptions of exemplary systems for accelerating access to data. Detailed descriptions of corresponding computer-implemented methods will also be provided in connection with FIG. 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for accelerating access to data. As illustrated in this figure, exemplary system 100 may include one or more modules 102 for performing one or more tasks. For example, and as will be explained in greater detail below, exemplary system 100 may include a monitoring module 104 that monitors, at a data-caching system, (1) read requests of a first data-accessing system for a dataset managed by a data-management system and (2) read requests of a second data-accessing system for the dataset managed by the data-management system. Exemplary system 100 may also include an identifying module 106 that identifies a pattern of the read requests of the first data-accessing system and a pattern of the read requests of the second data-accessing system.

In addition, and as will be described in greater detail below, exemplary system 100 may include a determining module 108 that determines that the pattern of the read requests of the second data-accessing system resembles the pattern of the read requests of the first data-accessing system. Exemplary system 100 may also include a pre-warming module 110 that uses a portion of the dataset accessed by the read requests of the first data-accessing system to pre-warm a cache of the second data-accessing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2-5, computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include patterns 122 for storing patterns of read requests. Database 120 may represent portions of a single database or computing device or a plurality of databases or computing devices. For example, database 120 may represent a portion of data-caching system 206 and/or data-management system 210 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as data-caching system 206 and/or data-management system 210 in FIG. 2, computing system 710 in FIG. 7, and/or portions of exemplary network architecture 800 in FIG. 8.

Figure 2:
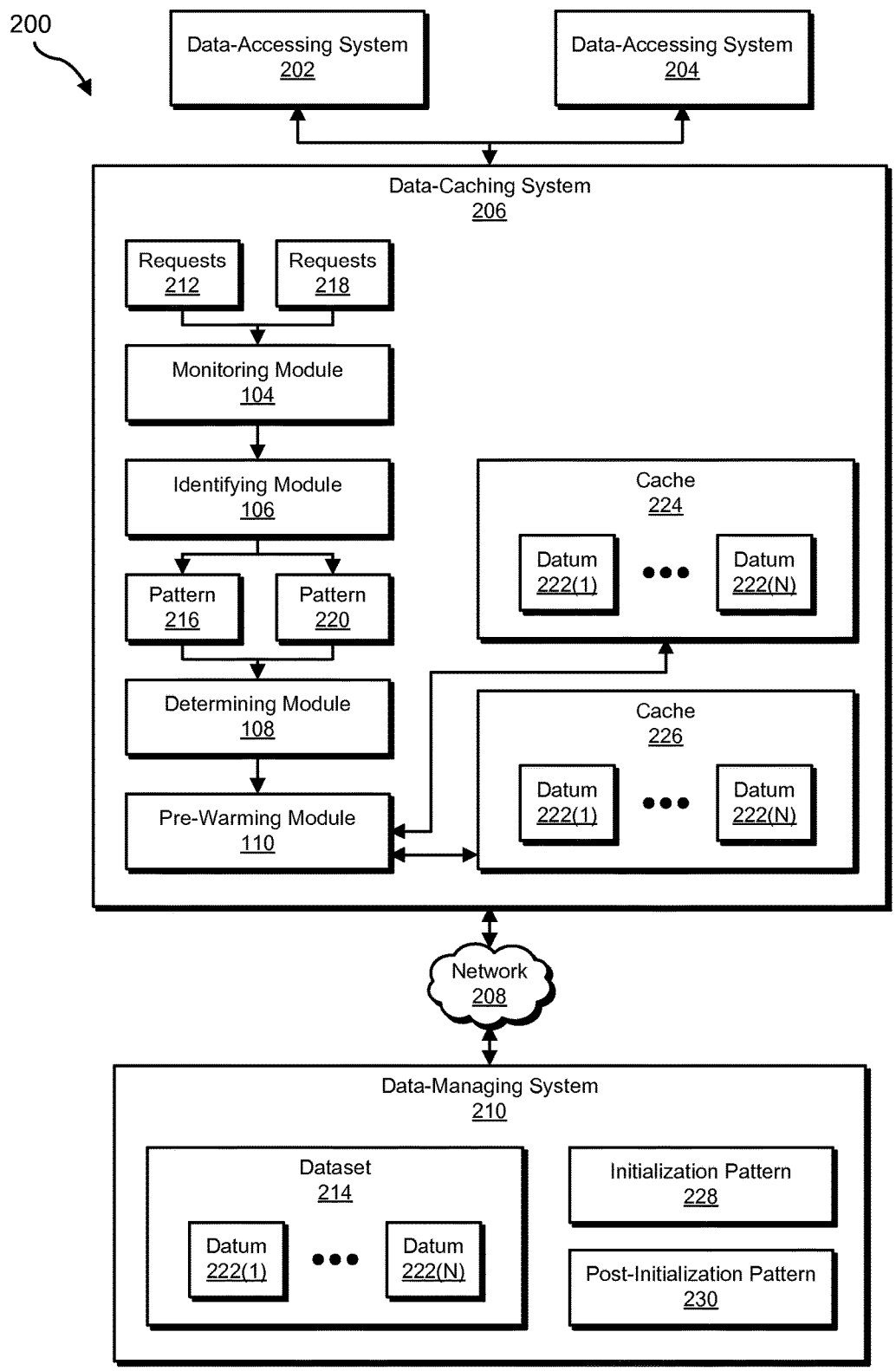
FIG. 2 is a block diagram of an additional exemplary system for accelerating access to data.

Exemplary system 100 in FIG. 1 may be implemented in a variety of ways. For example, all or a portion of exemplary system 100 may represent portions of exemplary system 200 in FIG. 2. As shown in FIG. 2, system 200 may include a data-accessing system 202, a data-accessing system 204, a data-caching system 206, a network 208, and a data-managing system 210. In one example, data-caching system 206 may be programmed with one or more of modules 102 and/or may store all or a portion of the data in database 120. Additionally or alternatively, data-managing system 210 may be programmed with one or more of modules 102 and/or may store all or a portion of the data in database 120. In the example shown in FIG. 2, data-caching system 206 may (1) serve dataset 214 to data-accessing system 202, (2) maintain cache 224 for data-accessing system 202, (3) serve dataset 214 to data-accessing system 204, and (4) maintain cache 226 for data-accessing system 204.

In one embodiment, one or more of modules 102 from FIG. 1 may, when executed by at least one processor of data-caching system 206 and/or data-management system 210, enable data-caching system 206 and/or data-management system 210 to accelerate access to dataset 214. For example, and as will be described in greater detail below, one or more of modules 102 may cause data-caching system 206 and/or data-management system 210 to (1) monitor read requests 212 of data-accessing system 202 for dataset 214 managed by data-management system 210, (2) identify pattern 216 of read requests 212, (3) monitor read requests 218 of data-accessing system 204 for dataset 214, (4) determine that pattern 220 of read requests 218 resembles pattern 216, and (5) use, in response to determining that pattern 220 resembles pattern 216, a portion of dataset 214 accessed by read requests 212 (e.g., data 222(1)-(N)) to pre-warm cache 226 of data-accessing system 204.

Data-accessing systems 202 and 204 generally represent any type or form of virtual or physical computing device and/or application capable of accessing data. In some examples, data-accessing systems 202 and 204 may represent systems for developing and/or testing services and/or applications that interact with dataset 214. In other examples, data-accessing systems 202 and 204 may represent virtual or physical application servers and database servers configured to provide various database services and/or run certain software applications. In at least one example, data-accessing systems 202 and 204 may represent database services and/or software applications.

Data-caching system 206 generally represents any system that implements caching for one or more systems or applications without requiring the systems or applications to be aware of and/or handle any caching operations (e.g., allowing the applications to perform I/O operations normally as if no caching were implemented). As shown in FIG. 2, data-caching system 206 may cache and serve portions of dataset 214 to data-accessing systems 202 and 204. In this example, data-caching system 206 may maintain cache 224 for storing data accessed by data-accessing system 202 and cache 226 for storing data access by data-accessing system 204. In at least one example, cache 224 and cache 226 may represent a single consolidated, deduplication-aware cache. In some examples, data-caching system 206 may represent a caching mechanism, component, or add-on of a data-accessing system, a host of a data-accessing system (e.g., a hypervisor), and/or a data-management system.

Network 208 generally represents any medium or architecture capable of facilitating communication or data transfer. Examples of network 208 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 208 may facilitate communication or data transfer using wireless or wired connections. In one embodiment, network 208 may facilitate communication between data-caching system 206 and data-management system 210.

Data-management system 210 generally represents any type or form of apparatus and/or mechanism capable of storing datasets used by applications and/or servicing I/O throughput in connection with such applications. Examples of data-management system 210 include, without limitation, Solid-State Drives (SSDs), Redundant Array Of Independent Disks (RAIDs), Hard Disk Drives (HDDs), virtual disks, variations of one or more of the same, combinations of one or more of the same, exemplary computing system 710 in FIG. 7, portions of exemplary network architecture 800 in FIG. 8, or any other suitable storage devices. In at least one example, data-management system 210 may represent a copy-data management system (e.g., VERITAS VELOCITY). As shown in FIG. 2, data-management system 210 may store and/or service I/O requests for dataset 214.

Dataset 214 generally represents any form, representation, or collection of data stored on a storage system. Examples of datasets may include, without limitation, files, directories, volumes, snapshots, and/or backups. In at least one example, dataset 214 may represent a golden copy of a dataset (e.g., a golden copy of a production dataset or its backup) from which data-management system 210 may spawn one or more virtual copies that may be provided to and accessed by data-accessing systems 202 and 204.

Figure 3:
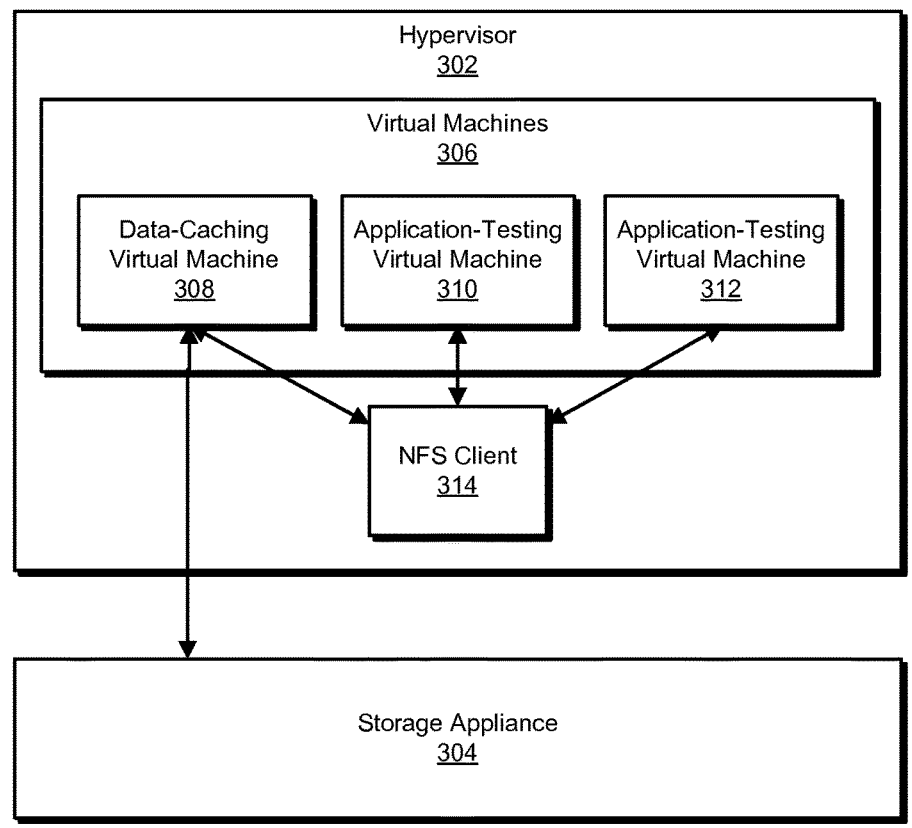
FIG. 3 is a block diagram of an additional exemplary system for accelerating access to data.

Exemplary system 200 in FIG. 2 may be implemented in a variety of ways. For example, all or a portion of exemplary system 200 may represent portions of exemplary system 300 in FIG. 3. As shown in FIG. 3, system 300 may include a hypervisor 302 in connection with a storage appliance 304. In this example, hypervisor 302 may host several virtual machines 306 (e.g., data-caching virtual machine 308, application-testing virtual machine 310, and application-testing virtual machine 312). In this example, application-testing virtual machine 310 and application-testing virtual machine 312 may represent data-accessing system 202 and data-accessing system 204 in FIG. 2, respectively. In this example, data-caching virtual machine 308 may represent data-caching system 206 in FIG. 2, and storage appliance 304 may represent data-management system 210 in FIG. 2.

Figure 4:
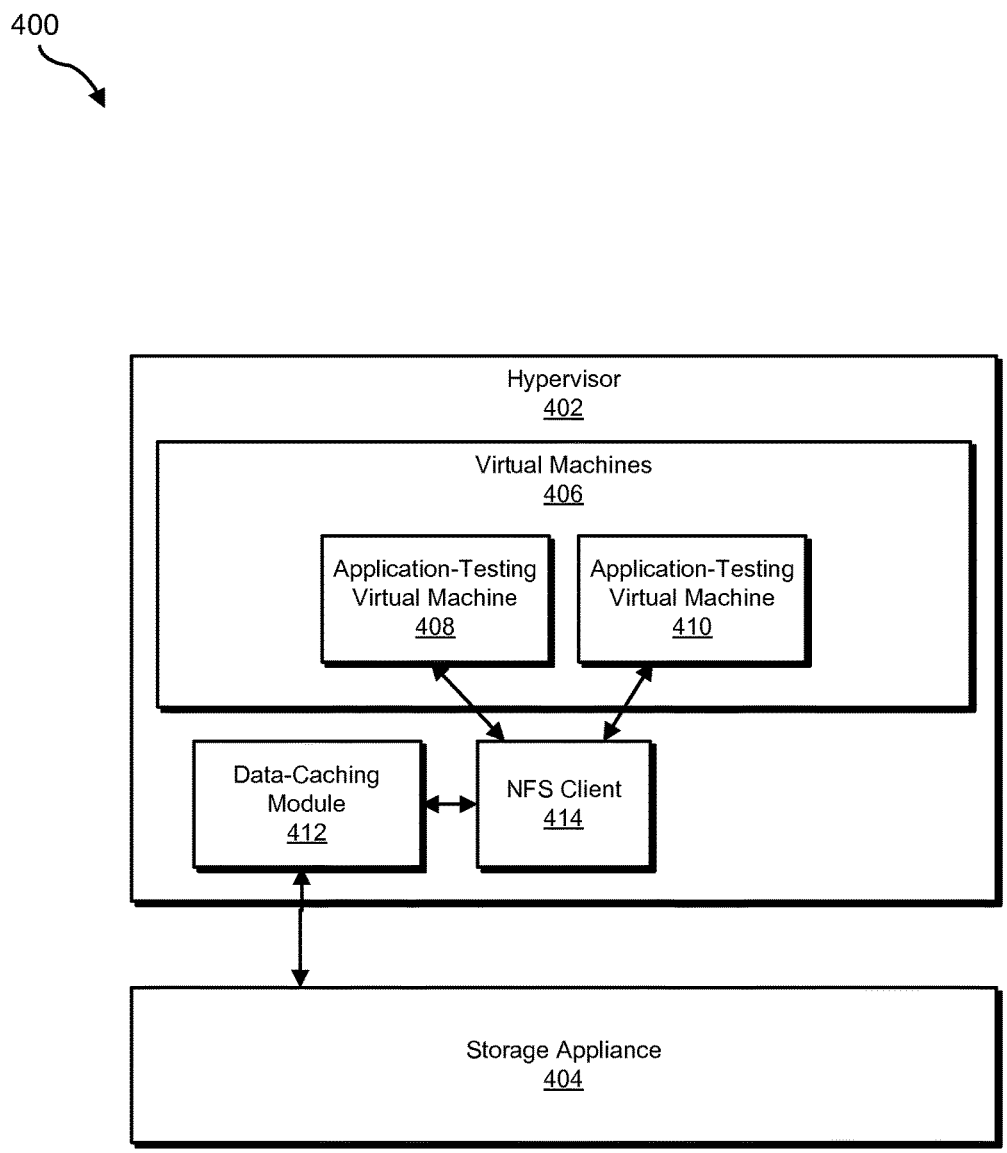
FIG. 4 is a block diagram of an additional exemplary system for accelerating access to data.

In another example, all or a portion of exemplary system 200 may represent portions of exemplary system 400 in FIG. 4. As shown in FIG. 4, system 400 may include a hypervisor 402 in connection with a storage appliance 404. In this example, hypervisor 402 may host several virtual machines 406 (e.g., application-testing virtual machines 408-410) and may include a data-caching module 412. In this example, application-testing virtual machines 408 and 410 may represent data-accessing systems 202 and 204 in FIG. 2. In this example, data-caching module 412 may represent data-caching system 206 in FIG. 2, and storage appliance 404 may represent data-management system 210 in FIG. 2.

Figure 5:
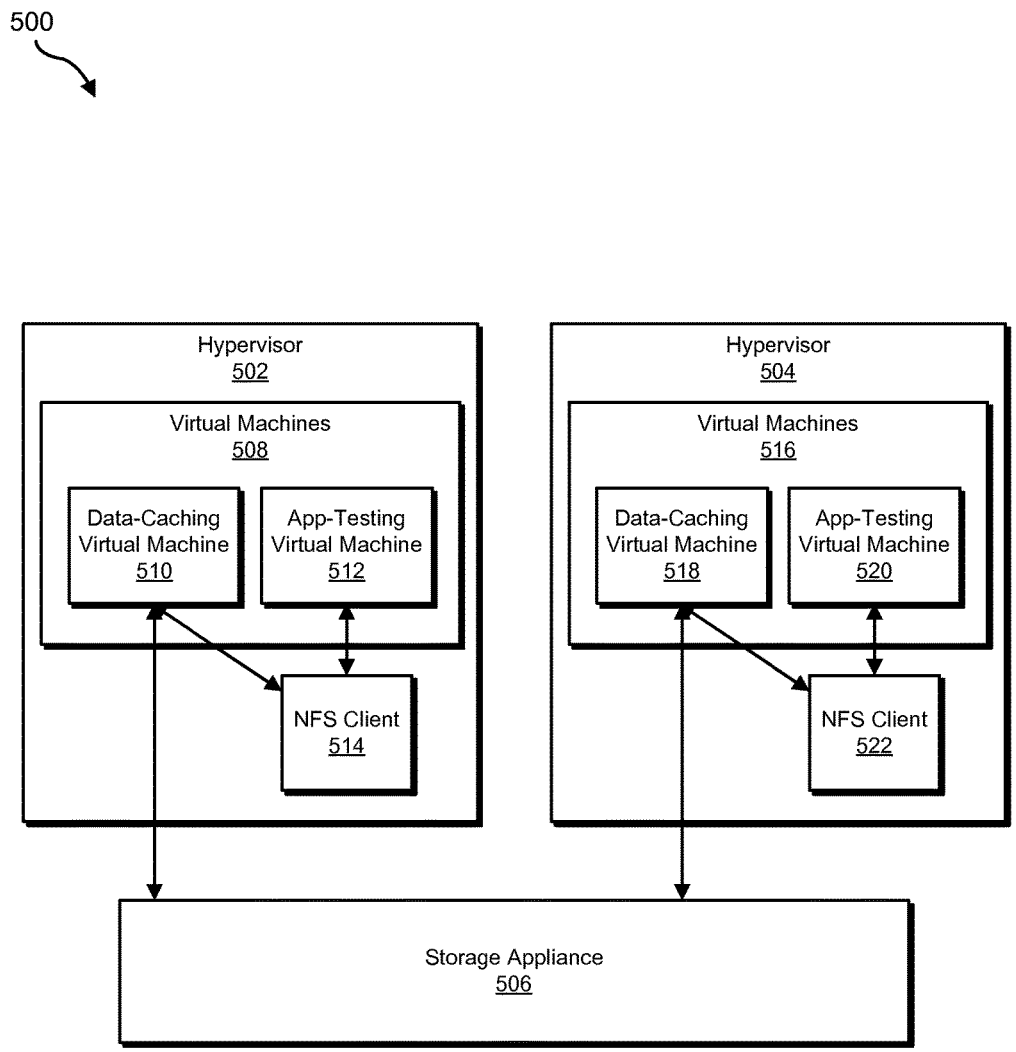
FIG. 5 is a block diagram of an additional exemplary system for accelerating access to data.

In another example, all or a portion of exemplary system 200 may represent portions of exemplary system 500 in FIG. 5. As shown in FIG. 5, system 500 may include a hypervisor 502 and a hypervisor 504 in connection with a storage appliance 506. In this example, hypervisor 502 may host several virtual machines 508 (e.g., data-caching virtual machine 510 and application-testing virtual machine 512), and hypervisor 504 may host several virtual machines 516 (e.g., data-caching virtual machine 518 and application-testing virtual machine 520). In this example, application-testing virtual machine 512 and application-testing virtual machine 520 may represent data-accessing system 202 and data-accessing system 204 in FIG. 2, respectively. In this example, data-caching virtual machine 510 and data-caching virtual machine 518 may represent subsystems of data-caching system 206 in FIG. 2, and storage appliance 506 may represent data-management system 210 in FIG. 2.

Figure 6:
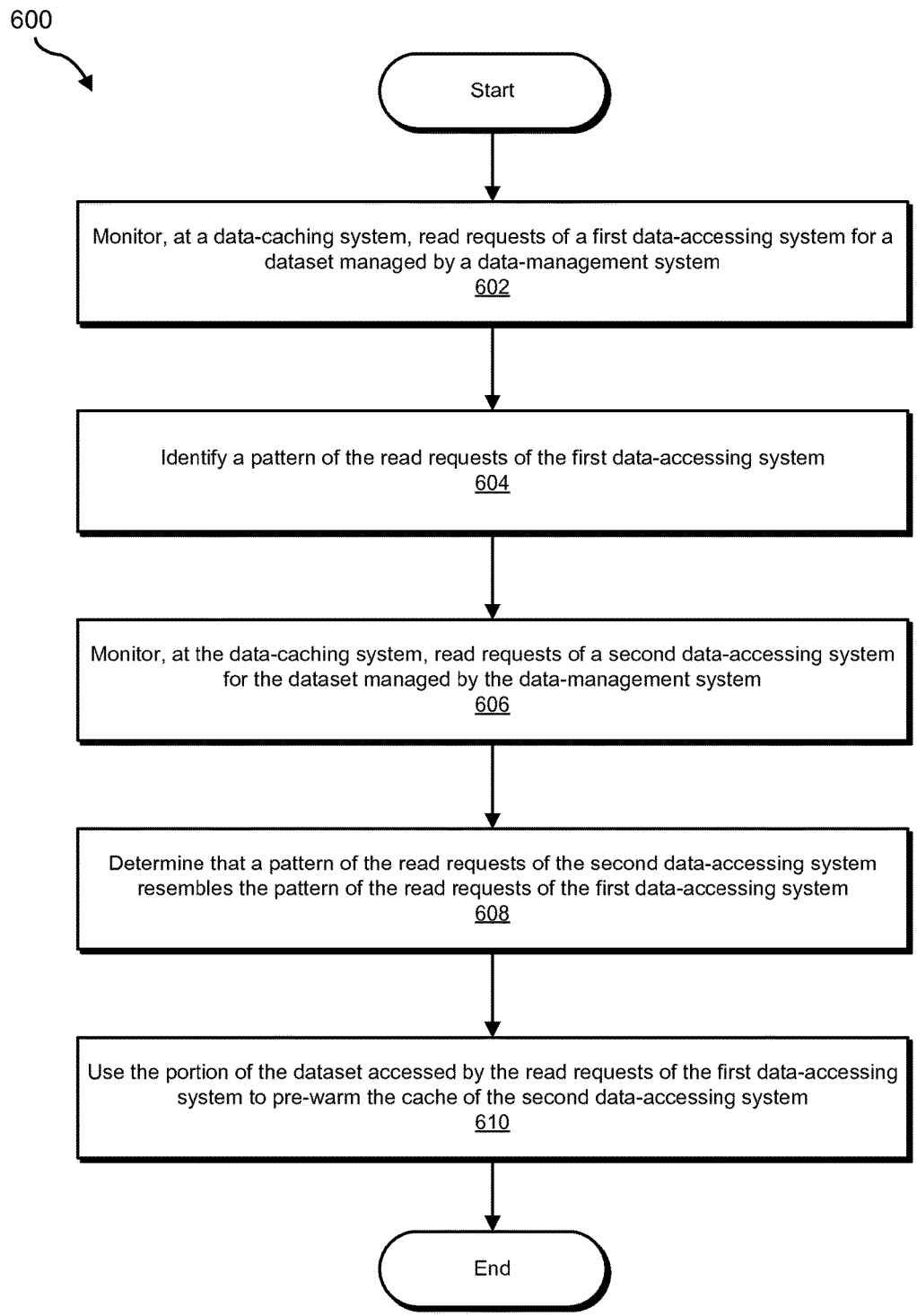
FIG. 6 is a flow diagram of an exemplary method for accelerating access to data.

FIG. 6 is a flow diagram of an exemplary computer-implemented method 600 for accelerating access to data. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, system 300 in FIG. 3, system 400 in FIG. 4, system 500 in FIG. 5, computing system 710 in FIG. 7, and/or portions of exemplary network architecture 800 in FIG. 8.

As illustrated in FIG. 6, at step 602 one or more of the systems described herein may monitor, at a data-caching system, read requests of a first data-accessing system for a dataset managed by a data-management system. For example, monitoring module 104 may, as part of data-caching system 206 in FIG. 2, monitor read requests 212 of data-accessing system 202 for dataset 214 managed by data-management system 210.

Monitoring module 104 may monitor and/or record various characteristics of the read requests of a data-accessing system for a dataset. For example, monitoring module 104 may monitor and/or record information that indicates what data within the dataset is accessed by the data-accessing system (e.g., filenames, addresses, offsets, etc.), when the data is accessed, the order in which the data is accessed, the frequency at which the data is accessed, the amount of the data accessed, the size of the data accessed, the entity (e.g., an application, test, function, or workload) responsible for the read requests, and/or any additional relevant information and/or metrics about the read requests of the data-accessing system.

Monitoring module 104 may monitor the read requests of a data-accessing system for a dataset during various phases of the data-accessing system. In one example, monitoring module 104 may monitor the read requests of a data-accessing system during an initialization or boot-up phase of the data-accessing system. If the data-accessing system is an application or a host of an application, monitoring module 104 may monitor the read requests of the application or host while the application initializes and/or while the host boots up. For example, monitoring module 104 may monitor the read requests of a database application while the database application recovers a database, applies archived logs, and brings the database to a consistent state ready to serve queries. In some examples, data-management system may determine that the initialization phase of a data-accessing system has completed by detecting an event that indicates as much.

Additionally or alternatively, monitoring module 104 may monitor the read requests of a data-accessing system during one or more post-initialization phases of the data-accessing system. If the data-accessing system is an application (e.g., a database application) or a host of an application, monitoring module 104 may monitor the read requests of the application or host after the application initializes and/or after the host boots up. In some examples, monitoring module 104 may determine that a post-initialization phase of a data-accessing system has started or ended by detecting an event that indicates as much. In some examples, a data-accessing system may perform various application tests. In these examples, monitoring module 104 may monitor the read requests of the data-accessing system during each of the tests.

At step 604, one or more of the systems described herein may identify a pattern of the read requests of the first data-accessing system. For example, identifying module 106 may, as part of data-caching system 206 in FIG. 2, identify pattern 216 of read requests 212.

Identifying module 106 may perform step 604 in any suitable manner. In general, identifying module 106 may identify and/or record one or more patterns of any of the information monitored at step 602 about the read requests of a data-accessing system. For example, identifying module 106 may identify and/or record a pattern of what data within a dataset is accessed by the data-accessing system (e.g., filenames, addresses, offsets, etc.), when the data is accessed, the order in which the data is accessed, the frequency at which the data is accessed, the amount of the data accessed, the size of the data accessed, the entity (e.g., an application, test, function, or workload) responsible for the read requests.

In some examples, identifying module 106 may identify at least one pattern of the read requests of a data-accessing system for each phase of the data-accessing system. For example, identifying module 106 may identify a pattern of the read requests of a data-accessing system that occur during an initialization phase of the data-accessing system and/or a pattern of the read requests of a data-accessing system that occur during a post-initialization phase of the data-accessing system.

Upon identifying a pattern of the read requests of a data-accessing system for a dataset, identifying module 106 may store a representation of the pattern in association with the dataset so that patterns of subsequent read requests for the dataset may be compared to the pattern. Using FIG. 2 as an example, upon identifying pattern 216 of read requests 212 for dataset 214, identifying module 106 may store, to data-management system 210, a representation of pattern 216 (e.g., as initialization pattern 228 or post-initialization pattern 230) in association with dataset 214 so that patterns of subsequent read requests for dataset 214 (e.g., pattern 220) may be compared to pattern 216.

At step 606, one or more of the systems described herein may monitor, at the data-caching system, read requests of a second data-accessing system for the dataset managed by the data-management system. For example, monitoring module 104 may, as part of data-caching system 206 in FIG. 2, monitor read requests 218 of data-accessing system 204 for dataset 214. Step 606 is similar to step 602, therefore, the discussion of step 602 may also apply to step 606.

At step 608, one or more of the systems described herein may determine that a pattern of the read requests of the second data-accessing system resembles the pattern of the read requests of the first data-accessing system. For example, determining module 108 may, as part of data-caching system 206 in FIG. 2, determine that pattern 220 of read requests 218 of data-accessing system 204 resembles pattern 216 of read requests 212 of data-accessing system 202.

Determining module 108 may determine that one pattern of read requests for a dataset resembles another pattern of read requests for the dataset in any suitable manner. In one example, in response to a data-accessing system's requests to access a dataset, determining module 108 may identify one or more previously recorded patterns of read requests associated with the dataset. As the data-accessing system requests to read from the dataset, determining module 108 may compare the pattern of the read requests of the data-accessing system to the previously recorded patterns to determine whether the pattern of the read requests of the data-accessing system resembles any of the previously recorded patterns. If the pattern of the read requests of the data-accessing system resembles a previously recorded pattern, the systems and methods disclosed herein may assume that the data-accessing system will likely access the dataset according to the previously recorded pattern. In general, determining module 108 may compare the pattern of read requests of a data-accessing system that occurs during each phase of the data-accessing system to previously recorded patterns.

Using FIG. 2 as an example, in response to a request from data-accessing system 204 to access dataset 214, determining module 108 may identify pattern 216 of read requests 212. Then as data-accessing system 204 requests to read from dataset 214, determining module 108 may compare pattern 220 of read requests 218 of data-accessing system 204 to pattern 216 to determine whether pattern 220 resembles pattern 216. If pattern 220 resembles pattern 216, the systems and methods disclosed herein may assume that data-accessing system 204 will likely access the same or similar portions of dataset 214 that were accessed by read requests 212 of data-accessing system 202. In this example, if pattern 220 resembles pattern 216, the systems and methods disclosed herein may assume that data-accessing system 204 will likely access data 222(1)-(N) of dataset 214.

At step 610, one or more of the systems described herein may use a portion of the dataset accessed by the read requests of the first data-accessing system to pre-warm the cache of the second data-accessing system. For example, pre-warming module 110 may, as part of data-caching system 206 in FIG. 2, use a portion of dataset 214 (e.g., data 222(1)-(N)) accessed by read requests 212 of data-accessing system 202 to pre-warm cache 226 of data-accessing system 204. Upon completion of step 610, exemplary method 600 in FIG. 6 may terminate.

The systems described herein may perform step 610 in any suitable manner. For example, in response to a determination that a pattern of the read requests of a data-accessing system for a dataset resemble a previously recorded pattern of read requests for the dataset, pre-warming module 110 may (1) prefetch a portion of the dataset that was accessed by the read requests associated with the previously recorded pattern and (2) store the portion of the dataset to the cache of the data-accessing system before the data-caching system requests the portion of the dataset.

Pre-warming module 110 may pre-warm a cache according to a pattern of read requests based on various characteristics of the read requests. In some examples, pre-warming module 110 may pre-warm a cache according to an initialization pattern of read requests by prefetching the data access by the read requests in the same order the data was accessed by the read requests. Additionally or alternatively, pre-warming module 110 may pre-warm a cache according to a post-initialization pattern of read requests by prefetching the data most frequently accessed by the read requests.

As explained above, by (1) recording a pattern to which a first system requests to read a dataset, (2) later detecting that a second system requests to read the same dataset according to the same or a similar pattern, and (3) pre-warming a cache maintained for the second system according to the pattern of the first system, the systems and methods described herein may enable a data-caching system to increase the speed at which the second system accesses the dataset since data from the dataset may be prefetched to the cache maintained for the second system before the second system attempts to access the data. In some examples, by pre-warming a cache maintained for an application development and/or testing system with data from an associated application development and/or testing system's previously recorded pattern, these systems and methods may help speed up application development and testing workloads. Furthermore, in some examples, by speeding up application development and testing workloads, these systems and methods may enable application development and testing workloads to be processed in the cloud, especially when the datasets that are required for application testing remain on premise.

Figure 7:
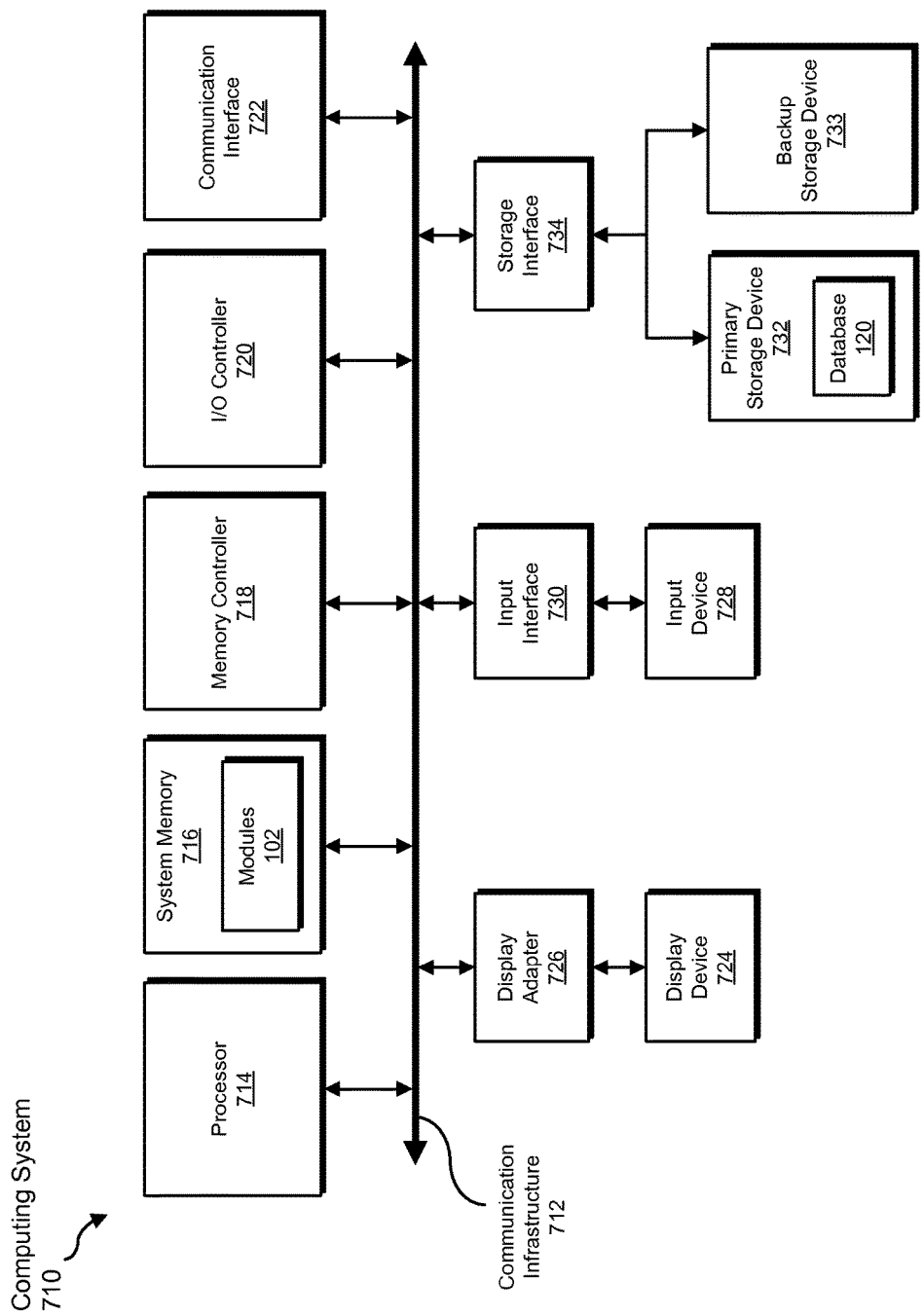
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 6). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
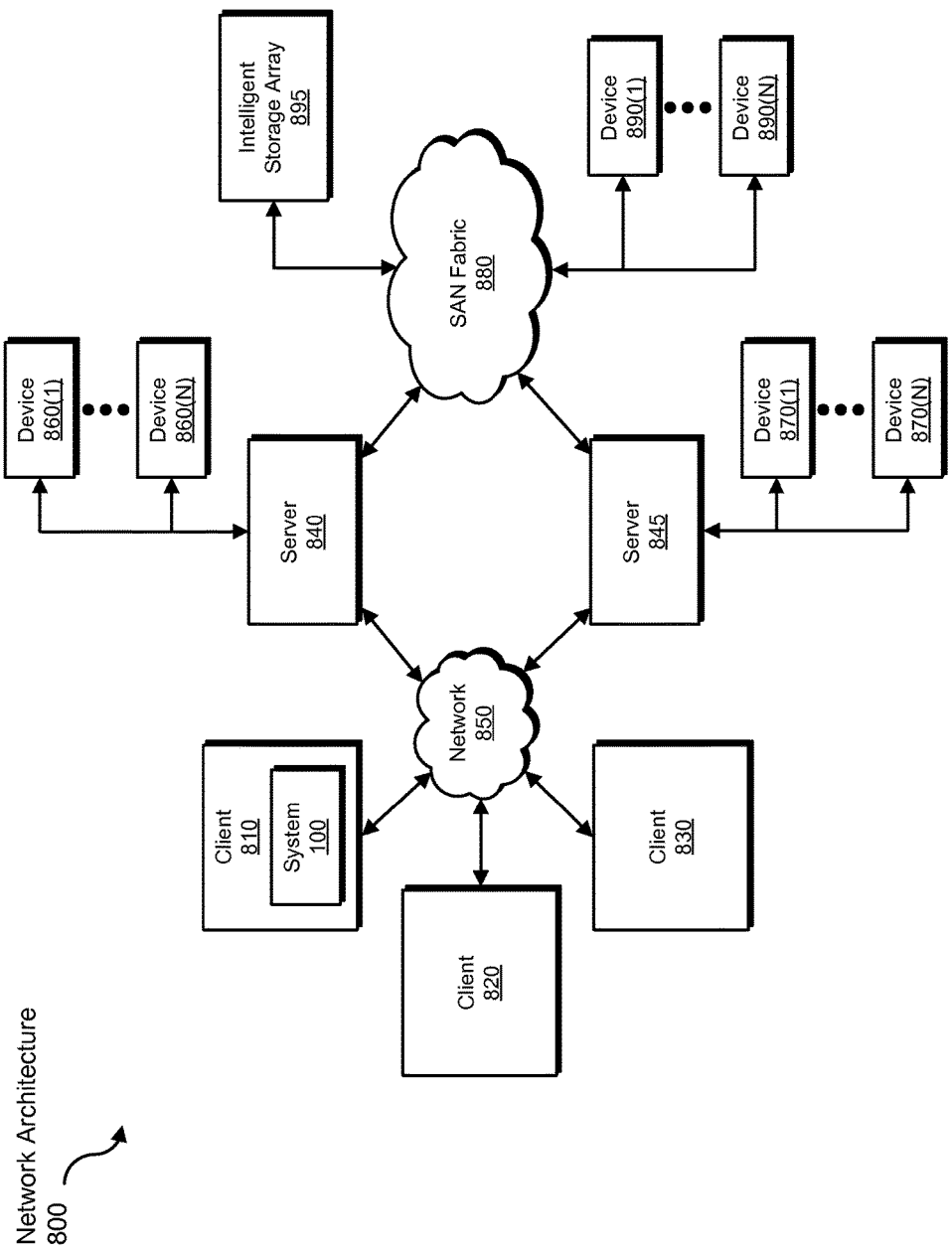
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 6). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for accelerating access to data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a series of read requests for a dataset from a data-accessing system to be transformed, transform the read requests into a pattern of read requests that may be compared to patterns of read requests of other data-accessing systems, output a result of the transformation to a data-caching system, use the result of the transformation to pre-warm the cache of an additional data-accessing system when a pattern of the read requests of the additional data-accessing system resembles the pattern of the read requests of the data-accessing system, and store the result of the transformation to a data-managing system that manages the dataset. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for accelerating access to data, at least a portion of the method being performed by a computing device comprising at least one processor, the method comprising:
spawning, at a data-management system for a first application-testing virtual machine, a first virtual disk from a dataset managed by the data-management system;
monitoring, at a data-caching system that serves the first virtual disk to the first application-testing virtual machine during an initialization phase of the first application-testing virtual machine, read requests of the first application-testing virtual machine for the first virtual disk;
identifying, at the data-caching system during the initialization phase, an initialization pattern of the read requests of the first application-testing virtual machine;
transferring, from the data-caching system, the initialization pattern of the read requests of the first application-testing virtual machine to the data-management system;
storing, at the data-management system, the initialization pattern of the read requests of the first application-testing virtual machine in association with the dataset;
detecting, at the data-caching system, an event that indicates an end of the initialization phase and a beginning of an application-testing phase of the first application-testing virtual machine, wherein the first application-testing virtual machine performs application testing during the application-testing phase;
monitoring, at the data-caching system during the application-testing phase, additional read requests of the first application-testing virtual machine for the first virtual disk;
identifying, at the data-caching system during the application-testing phase, an application-testing pattern of the additional read requests of the first application-testing virtual machine;
transferring, from the data-caching system, the application-testing pattern of the additional read requests of the first application-testing virtual machine to the data-management system;
storing, at the data-management system, the application-testing pattern of the additional read requests of the first application-testing virtual machine in association with the dataset;
receiving, at the data-caching system, a request by a second application-testing virtual machine to access a second virtual disk comprising the dataset;
spawning, at the data-management system for the second application-testing virtual machine, the second virtual disk from the dataset, wherein the data-caching system serves the second virtual disk to the second application-testing virtual machine and maintains a cache of the second virtual disk for the second application-testing virtual machine;
requesting, at the data-caching system from the data-management system in response to receiving the request, a pattern of read requests associated with the second virtual disk;
determining, at the data-management system, that the application-testing pattern of the additional read requests of the first application-testing virtual machine is a pattern of read requests associated with the second virtual disk;
transmitting, from the data-management system to the data-caching system, the application-testing pattern of the additional read requests of the first application-testing virtual machine;
monitoring, at the data-caching system, read requests of the second application-testing virtual machine for the second virtual disk;
determining, at the data-caching system, that a pattern of the read requests of the second application-testing virtual machine resembles the application-testing pattern of the additional read requests of the first application-testing virtual machine; and
using, at the data-caching system in response to determining that the pattern of the read requests of the second application-testing virtual machine resembles the application-testing pattern of the additional read requests of the first application-testing virtual machine, a portion of the dataset accessed by the additional read requests of the first application-testing virtual machine to pre-warm the cache of the second virtual disk.

2. The computer-implemented method of claim 1, wherein using the portion of the dataset accessed by the additional read requests of the first application-testing virtual machine to pre-warm the cache of the second virtual disk comprises pre-warming the cache of the second virtual disk with data most frequently accessed by the additional read requests of the first application-testing virtual machine.

3. The computer-implemented method of claim 1, further comprising:
   requesting, at the data-caching system from the data-management system in response to receiving the request, an additional pattern of read requests associated with the second virtual disk;
   determining, at the data-management system, that the initialization pattern of the read requests of the first application-testing virtual machine is an additional pattern of read requests associated with the second virtual disk;
   transmitting, from the data-management system to the data-caching system, the initialization pattern of the read requests of the first application-testing virtual machine;
   monitoring, at the data-caching system, additional read requests of the second application-testing virtual machine for the second virtual disk;
   determining, at the data-caching system, that a pattern of the additional read requests of the second application-testing virtual machine resembles the initialization pattern of the read requests of the first application-testing virtual machine; and
   pre-warming, at the data-caching system in response to determining that the pattern of the additional read requests of the second application-testing virtual machine resembles the initialization pattern of the read requests of the first application-testing virtual machine, the cache of the second virtual disk with data accessed by the read requests of the first application-testing virtual machine in the order the data was accessed by the read requests of the first application-testing virtual machine.

4. The computer-implemented method of claim 1, wherein:
   the dataset comprises a copy of a production dataset of a production environment;
   the first application-testing virtual machine is configured to test a first modification of the production environment; and
   the second application-testing virtual machine is configured to test a second modification of the production environment.

5. The computer-implemented method of claim 1, wherein the initialization pattern of the read requests of the first application-testing virtual machine comprises:
   an initialization pattern that occurred during an application initialization phase of an application running on the first application-testing virtual machine; or
   an initialization pattern that occurred as the first application-testing virtual machine booted up.

6. The computer-implemented method of claim 1, wherein identifying the application-testing pattern of the additional read requests of the first application-testing virtual machine comprises identifying a pattern of the additional read requests of the first application-testing virtual machine that occurred during one of a plurality of tests performed by the first application-testing virtual machine.

7. The computer-implemented method of claim 1, wherein:
   the data-caching system maintains a cache of the first virtual disk for the first application-testing virtual machine; and
   the cache of the first virtual disk and the cache of the second virtual disk comprise a single deduplication-aware cache.

8. The computer-implemented method of claim 1, wherein:
   the first application-testing virtual machine runs on a hypervisor;
   the second application-testing virtual machine runs on the hypervisor; and
   the data-caching system comprises a data-caching module of the hypervisor.

9. The computer-implemented method of claim 1, wherein determining that the pattern of the read requests of the second application-testing virtual machine resembles the application-testing pattern of the additional read requests of the first application-testing virtual machine comprises determining that the pattern of the read requests of the second application-testing virtual machine matches the application-testing pattern of the additional read requests of the first application-testing virtual machine.

10. The computer-implemented method of claim 1, wherein determining that the pattern of the read requests of the second application-testing virtual machine resembles the application-testing pattern of the additional read requests of the first application-testing virtual machine comprises determining that a similarity of the pattern of the read requests of the second application-testing virtual machine to the application-testing pattern of the additional read requests of the first application-testing virtual machine is above a predetermined threshold.

11. The computer-implemented method of claim 1, wherein:
   the first application-testing virtual machine runs on a hypervisor;
   the second application-testing virtual machine runs on the hypervisor; and
   the data-caching system executes within a third virtual machine running on the hypervisor.

12. The computer-implemented method of claim 1, wherein:
   the first application-testing virtual machine runs on a first hypervisor;
   the second application-testing virtual machine runs on a second hypervisor;
   the data-caching system comprises:
      a first data-caching subsystem that maintains a cache of the first virtual disk for the first application-testing virtual machine and executes within a third virtual machine running on the first hypervisor; and
      a second data-caching subsystem that maintains the cache of the second virtual disk for the second application-testing virtual machine and executes within a fourth virtual machine running on the second hypervisor;
   the first data-caching subsystem performs the steps of monitoring the read requests of the first application-testing virtual machine, identifying the application-testing pattern of the additional read requests of the first application-testing virtual machine, and transferring the application-testing pattern of the additional read requests of the first application-testing virtual machine to the data-management system; and the second data-caching subsystem performs the steps of receiving the request by the second application-testing virtual machine to access the second virtual disk, requesting a pattern of read requests associated with the second virtual disk, monitoring the read requests of the second application-testing virtual machine, determining that the pattern of the read requests of the second application-testing virtual machine resembles the application-testing pattern of the additional read requests of the first application-testing virtual machine, and using the portion of the dataset accessed by the additional read requests of the first application-testing virtual machine to pre-warm the cache of the second virtual disk.

13. A system for accelerating access to data, the system comprising:
a data-management subsystem that:
spawns, for a first application-testing virtual machine, a first virtual disk from a dataset managed by the data-management system;
spawns, for a second application-testing virtual machine, a second virtual disk from the dataset;
a monitoring module, stored in memory, that:
monitors, at a data-caching system that serves the first virtual disk to the first application-testing virtual machine and the second virtual disk to the second application-testing virtual machine:
read requests of the first application-testing virtual machine for the first virtual disk during an initialization phase of the first application-testing virtual machine;
additional read requests of the first application-testing virtual machine for the first virtual disk during an application-testing phase of the first application-testing virtual machine, wherein the first application-testing virtual machine performs application testing during the application-testing phase; and
read requests of the second application-testing virtual machine for the second virtual disk;
detects, at the data-caching system, an event that indicates an end of the initialization phase and a beginning of the application-testing phase, wherein the data-caching system maintains a cache of the second virtual disk for the second application-testing virtual machine;
an identifying module, stored in memory, that:
identifies, at the data-caching system during the initialization phase, an initialization pattern of the read requests of the first application-testing virtual machine;
transfers, from the data-caching system, the initialization pattern of the read requests of the first application-testing virtual machine to the data-management system;
identifies, at the data-caching system during the application-testing phase, an application-testing pattern of the additional read requests of the first application-testing virtual machine; and
transfers, from the data-caching system, the application-testing pattern of the additional read requests of the first application-testing virtual machine to the data-management system, wherein:
the data-management system further stores the initialization pattern of the read requests of the first application-testing virtual machine and the application-testing pattern of the additional read requests of the first application-testing virtual machine in association with the dataset;
the monitoring module further requests, at the data-caching system in response to receiving a request by the second application-testing virtual machine to access the second virtual disk, a pattern of read requests associated with the second virtual disk from the data-management system;
the data-management system further:
determines that the application-testing pattern of the additional read requests of the first application-testing virtual machine is a pattern of read requests associated with the second virtual disk; and
transmits the application-testing pattern of the additional read requests of the first application-testing virtual machine to the data-caching system;
a determining module, stored in memory, that determines, at the data-caching system, that a pattern of the read requests of the second application-testing virtual machine resembles the application-testing pattern of the additional read requests of the first application-testing virtual machine;
a pre-warming module, stored in memory, that uses, at the data-caching system in response to the determination that the pattern of the read requests of the second application-testing virtual machine resembles the application-testing pattern of the additional read requests of the first application-testing virtual machine, a portion of the dataset accessed by the additional read requests of the first application-testing virtual machine to pre-warm the cache of the second virtual disk; and
at least one processor that executes the monitoring module, the identifying module, the determining module, and the pre-warming module.

14. The system of claim 13, wherein:
the first application-testing virtual machine runs on a hypervisor;
the second application-testing virtual machine runs on the hypervisor; and
the data-caching system executes within a third virtual machine running on the hypervisor.

15. The system of claim 13, wherein:
the first application-testing virtual machine runs on a first hypervisor;
the second application-testing virtual machine runs on a second hypervisor; and
the data-caching system comprises:
a first data-caching subsystem that maintains a cache of the first virtual disk for the first application-testing virtual machine and executes within a third virtual machine running on the first hypervisor; and
a second data-caching subsystem that maintains the cache of the second virtual disk for the second application-testing virtual machine and executes within a fourth virtual machine running on the second hypervisor.

16. The system of claim 13, wherein:
the first application-testing virtual machine runs on a hypervisor;
the second application-testing virtual machine runs on the hypervisor; and
the data-caching system comprises a data-caching module of the hypervisor.

17. The system of claim 13, wherein:
the dataset comprises a copy of a production dataset of a production environment;
the first application-testing virtual machine is configured to test a first modification of the production environment; and
the second application-testing virtual machine is configured to test a second modification of the production environment.

18. The system of claim 17, wherein the identifying module identifies the application-testing pattern of the additional read requests of the first application-testing virtual machine by identifying a pattern of the additional read requests of the first application-testing virtual machine that occurred during one of a plurality of tests performed by the first application-testing virtual machine.

19. The system of claim 18, wherein:
the data-caching system maintains a cache of the first virtual disk for the first application-testing virtual machine; and
the cache of the first virtual disk and the cache of the second virtual disk comprise a single deduplication-aware cache.

20. A non-transitory computer-readable medium comprising one or more computer-executable instructions that, when executed by at least one processor of at least one computing device, cause the at least one computing device to:
spawn, at a data-management system for a first application-testing virtual machine, a first virtual disk from a dataset managed by the data-management system;
monitor, at a data-caching system that serves the first virtual disk to the first application-testing virtual machine during an initialization phase of the first application-testing virtual machine, read requests of the first application-testing virtual machine for the first virtual disk;
identify, at the data-caching system during the initialization phase, an initialization pattern of the read requests of the first application-testing virtual machine;
transfer, from the data-caching system, the initialization pattern of the read requests of the first application-testing virtual machine to the data-management system;
store, at the data-management system, the initialization pattern of the read requests of the first application-testing virtual machine in association with the dataset;
detect, at the data-caching system, an event that indicates an end of the initialization phase and a beginning of an application-testing phase of the first application-testing virtual machine, wherein the first application-testing virtual machine performs application testing during the application-testing phase;
monitor, at the data-caching system during the application-testing phase, additional read requests of the first application-testing virtual machine for the first virtual disk;
identify, at the data-caching system during the application-testing phase, an application-testing pattern of the additional read requests of the first application-testing virtual machine;
transfer, from the data-caching system, the application-testing pattern of the additional read requests of the first application-testing virtual machine to the data-management system;
store, at the data-management system, the application-testing pattern of the additional read requests of the first application-testing virtual machine in association with the dataset;
receive, at the data-caching system, a request by a second application-testing virtual machine to access a second virtual disk comprising the dataset;
spawn, at the data-management system for the second application-testing virtual machine, the second virtual disk from the dataset, wherein the data-caching system serves the second virtual disk to the second application-testing virtual machine and maintains a cache of the second virtual disk for the second application-testing virtual machine;
request, at the data-caching system from the data-management system in response to receiving the request, a pattern of read requests associated with the second virtual disk;
determine, at the data-management system, that the application-testing pattern of the additional read requests of the first application-testing virtual machine is a pattern of read requests associated with the second virtual disk;
transmit, from the data-management system to the data-caching system, the application-testing pattern of the additional read requests of the first application-testing virtual machine;
monitor, at the data-caching system, read requests of the second application-testing virtual machine for the second virtual disk;
determine, at the data-caching system, that a pattern of the read requests of the second application-testing virtual machine resembles the application-testing pattern of the additional read requests of the first application-testing virtual machine; and
use, at the data-caching system in response to determining that the pattern of the read requests of the second application-testing virtual machine resembles the application-testing pattern of the additional read requests of the first application-testing virtual machine, a portion of the dataset accessed by the additional read requests of the first application-testing virtual machine to pre-warm the cache of the second virtual disk.

* * * * *